United States Patent
Roussey

(10) Patent No.: US 8,601,904 B2
(45) Date of Patent: Dec. 10, 2013

(54) FORCE TRANSMISSION ASSEMBLY AND A CONTROL ASSEMBLY INCLUDING SUCH AN ASSEMBLY

(75) Inventor: Bastien Jean Charles Roussey, Tain l'Hermitage (FR)

(73) Assignee: Fly By Wire Systems France, Saint-Vallier (FR)

( * ) Notice: Subject to any disclaimer, the term of this patent is extended or adjusted under 35 U.S.C. 154(b) by 75 days.

(21) Appl. No.: 13/124,853

(22) PCT Filed: Oct. 27, 2009

(86) PCT No.: PCT/FR2009/052073
§ 371 (c)(1),
(2), (4) Date: Apr. 19, 2011

(87) PCT Pub. No.: WO2010/049644
PCT Pub. Date: May 6, 2010

(65) Prior Publication Data
US 2011/0214520 A1   Sep. 8, 2011

(30) Foreign Application Priority Data

Oct. 28, 2008   (FR) ...................... 08 57332

(51) Int. Cl.
*F16H 53/06*   (2006.01)
(52) U.S. Cl.
USPC .......................................................... 74/569
(58) Field of Classification Search
USPC ....................... 74/89, 567, 569; 244/99.2, 221
See application file for complete search history.

(56) References Cited

U.S. PATENT DOCUMENTS

| | | | |
|---|---|---|---|
| 2,678,177 A | | 5/1954 | Chenery et al. |
| 3,750,984 A | | 8/1973 | Mouttet et al. |
| 3,774,462 A | * | 11/1973 | Thompson ................... 74/89.36 |
| 4,535,643 A | * | 8/1985 | Hauptman ........................ 74/89 |
| 5,249,761 A | * | 10/1993 | Schroppel ..................... 244/3.21 |
| 6,073,503 A | * | 6/2000 | Matsuno et al. .................. 74/55 |
| 6,641,085 B1 | | 11/2003 | Delea et al. |
| 2002/0185355 A1 | | 12/2002 | Drussel |

FOREIGN PATENT DOCUMENTS

| | | |
|---|---|---|
| DE | 522996 C | 4/1931 |
| DE | 3534935 A1 | 4/1987 |
| FR | 2137300 A | 12/1972 |

* cited by examiner

*Primary Examiner* — Vicky Johnson
(74) *Attorney, Agent, or Firm* — Dowell & Dowell, PC

(57) ABSTRACT

The invention relates to a force transmission unit (1), particularly enabling the transmission of forces between a lever and a steering member, including: —a force transmission device (8) comprising a shaft (81) defining a central axis (X-X), and—a force accompanying device (3) comprising: —a cam (71), the shaft and the cam being suitable for being rotatably mobile in relation to one another, —a push member (6) suitable for engaging with the cam and for translating along the shaft, and—and a resilient member (9) suitable for working under compression during a translation movement of the push member (6), said translation movement being caused by activating the transmission unit. The push member (6) includes, at the same time, a body (68) designed for receiving cam followers (621; 622) suitable for engaging with the cam (71), and a linear bearing (64) arranged in the body, the bearing being suitable for engaging with the shaft (81).

20 Claims, 3 Drawing Sheets

FORCE TRANSMISSION ASSEMBLY AND A CONTROL ASSEMBLY INCLUDING SUCH AN ASSEMBLY

BACKGROUND OF THE INVENTION

1. Field of the Invention

The present invention relates to a force transmission assembly used, in particular, in piloting an aircraft, and it also relates to a control assembly including such an assembly.

2. Brief Description of the Related Art

An aircraft, such as a helicopter or an airplane, generally includes a control assembly equipped with at least one lever, commonly referred to as a "stick". The pilot operates the lever so as to transmit instructions to the direction control members of the aircraft, such as rotary wing blades. The lever is connected to the direction control members via at least one force transmission assembly.

It is known for use to be made of such a transmission assembly that includes at least one torsion spring box made up of one or more torsion springs making it possible to define the relationship for shift as a function of torque applied by the lever. Such a relationship is linear relative to the variation in the value of the angle between a final position and an initial position of the lever.

Nevertheless, the movement in rotation of the lever is limited by the capacity of the spring to twist. If it is desired to have high amplitude variation in the angle of rotation of the lever, it is necessary to increase the length of the torsion spring. Alternatively, provision may be made to increase the diameter of the spring working in torsion. In both situations, the overall size of the spring box and, as a result, of the transmission assembly, is necessarily increased.

Document DE-A-35 34 935 proposes a force transmission assembly designed to be incorporated into a clutch. In that example, a wheel, that is mounted to rotate about a hub shaft, is provided with a drive lever and with two opposite cams that bear against rollers fastened to a stationary support. Under the action of those cams, the wheel moves in translation along the hub shaft, while driving in translation a pusher that bears against brake disks, and while also compressing a spring interposed between the pusher and an annular end of the hub shaft. That pusher is constrained in rotation with the hub shaft by a through pin, with non-negligible angular backlash and non-negligible friction. That solution does not therefore enable an angular position of the lever to be caused to correspond accurately to a transmitted torque value, due to the backlash and to the friction hysteresis. That makes that solution inappropriate for the above-mentioned field of piloting an aircraft. In other words, the transmission assembly of DE-A-35 34 935 is neither designed nor intended to cause a position of its lever to correspond to a given force on that lever, in that the forces relative to the lever can be quite different depending on the direction of actuation of the transmission assembly, namely depending on whether it is actuated in a clutching direction or in a declutching direction.

SUMMARY OF THE INVENTION

An object of the present invention is to provide a force transmission assembly that is suitable for transmitting the actual torque generated by a movement in rotation of the lever, while also guaranteeing that the assembly offers compact overall size and satisfactory transmission accuracy.

To this end, the invention provides a force transmission assembly making it possible, in particular, to transmit forces between a lever and a direction control member, and assembly as defined herein and as shown in the drawings.

By means of the assembly of the invention, force transmission is improved, in particular by means of the ball bushing, and the angular amplitude of the movement of the lever is optimized. The application of the invention to the field of piloting an aircraft is then remarkable in that, with a compact overall size, the transmission assembly guarantees a reliable and accurate relationship for shift as a function of torque applied by or to a lever.

Other advantageous characteristics of the transmission assembly of the invention, taken in isolation or in any technically feasible combination are specified in the following description of the invention.

The present invention also provides a control assembly as described herein and as shown in the drawings.

BRIEF DESCRIPTION OF THE DRAWINGS

The invention can be better understood on reading the following description given by way of non-limiting example and with reference to the drawings, in which:

FIG. 6 is a perspective view of the assembly during force transmission; and

FIG. 7 is a perspective view of the assembly, once the force has been transmitted.

DESCRIPTION OF THE PREFERRED EMBODIMENTS

Figure 1:
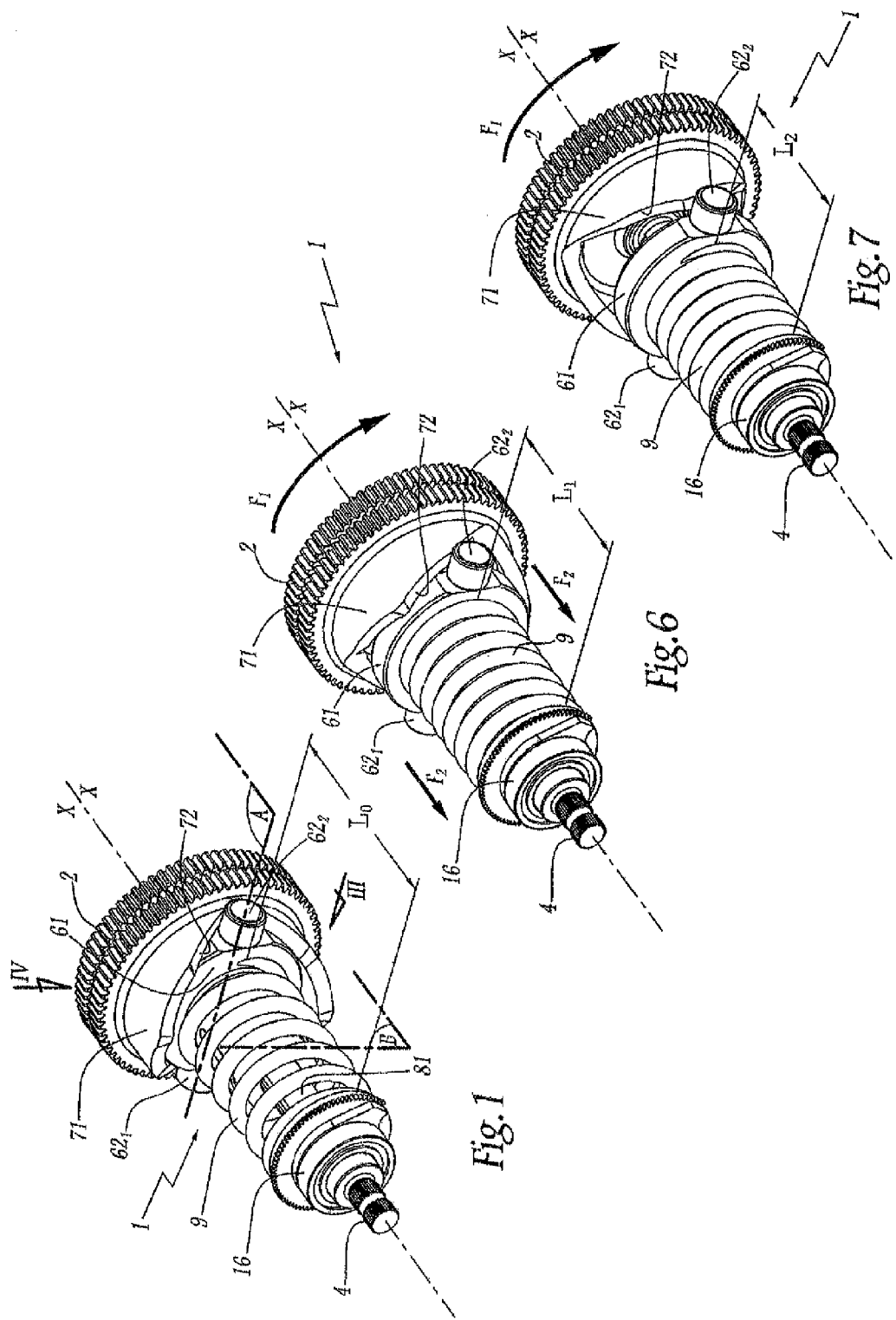
FIG. 1 is a perspective view of a force transmission assembly of the present invention.
Figure 2:
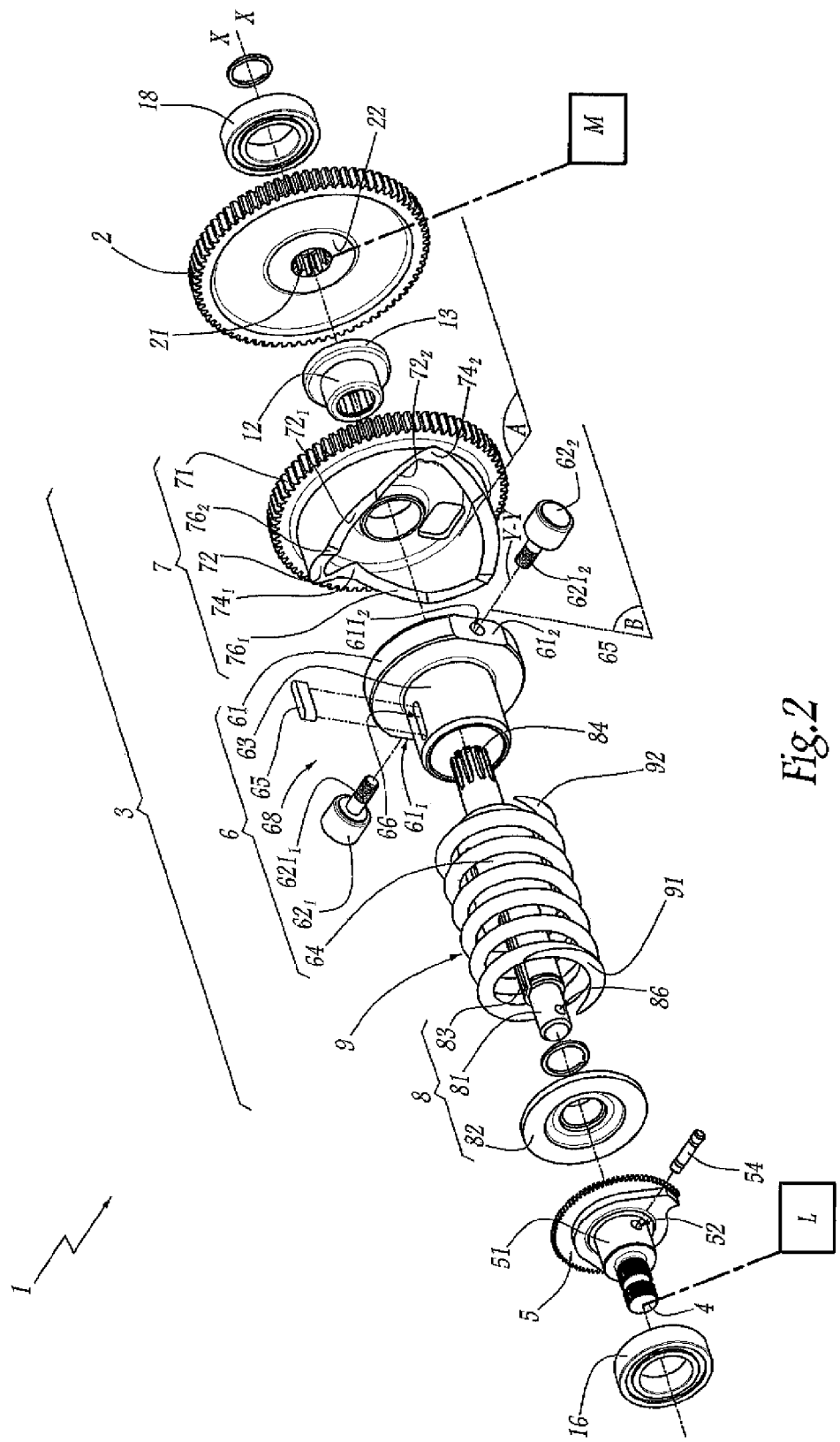
FIG. 2 is an exploded perspective view of the assembly shown in FIG. 1.
Figure 3:
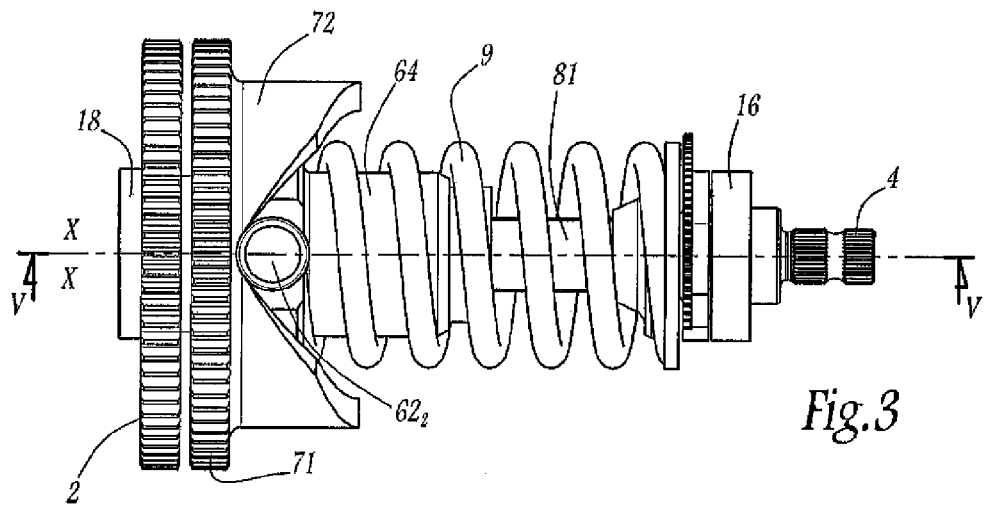
FIG. 3 is a side view of the assembly shown in FIG. 1, seen looking along arrow III.
Figure 4:
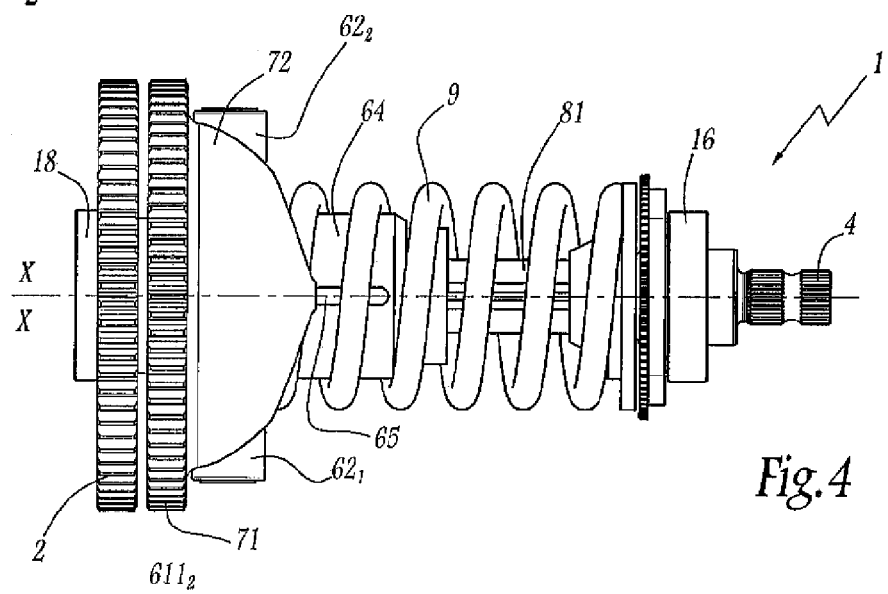
FIG. 4 is a view from above of the assembly shown in FIG. 1, seen looking along arrow IV.
Figure 5:
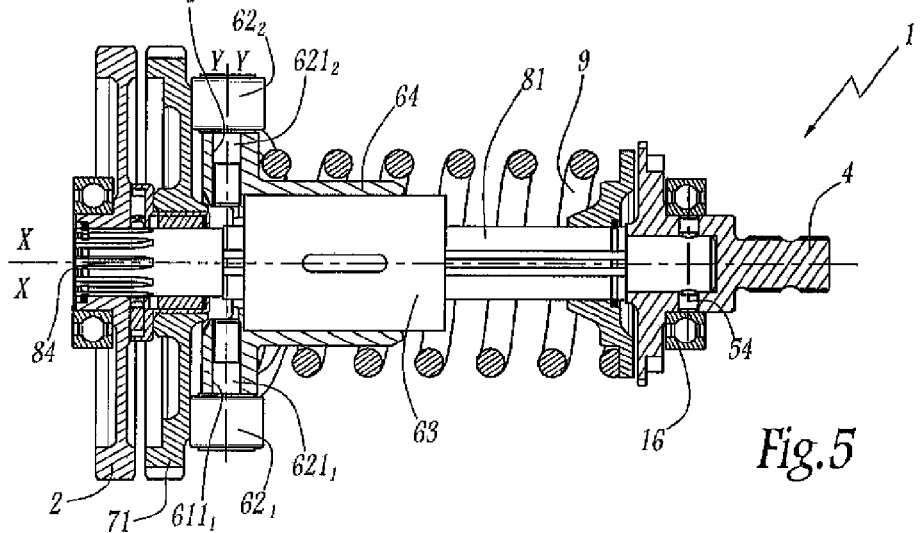
FIG. 5 is a section view of the assembly on line V shown in FIG. 3.

FIGS. 1 to 7 show an assembly 1 making it possible to transmit a force initiated, at an inlet, for example, by a lever "L"that is connected to a splined shaft 4 as shown in FIG. 2. By operating the lever, a pilot transmits control instructions, in the form of torque to direction control members "M" of an aircraft. The lever is adapted to actuate the splined shaft 4 disposed on a support device 5. At the outlet of the assembly 1, a toothed wheel 2 having a central opening 21 is connected to a magnetic damper system (not shown). The central opening 21 is provided with grooves and is disposed at the centre of a set-back annular portion 22, defined inside a substantially circular shoulder. The lever, the assembly 1, and the direction control member constitute a control assembly for controlling the aircraft.

As shown in FIG. 2, the assembly 1 includes a force-accompanying device 3. This device 3 includes a pusher 6 defining a central axis X-X. The pusher 6 comprises a body 68 made up of two supports 61 and 63. The support 61, which is substantially circular shape, is secured to the support 63 that is of substantially tubular shape and that is of diameter corresponding to the inside diameter of the annular support 61. The two supports 61 and 63 may be made integrally as a single piece. The support 61 is provided with two flats $61_1$ and $62_2$ disposed in diametrically opposite manner. Each of the flats is provided with a respective opening $611_1$, $611_2$ adapted to receive a respective stud $621_1$, $621_1$ that is secured to or integral with a cam roller $62_1$, $62_2$. Once fastened to the support 61, the two rollers 62₁ and 62₂ define an axis Y-Y that is substantially perpendicular to the axis X-X. In addition, the member 6 includes a ball bushing 64 that is secured to the support 63 via a key 65 adapted to be inserted into an opening 66 arranged in the support 63.

A first type of ball bushing is provided with "elliptical" ball races. The race is constituted by a first portion of an ellipse recessed in the bushing and of a second portion of an ellipse recessed in a shaft, along which the bushing can move in translation. The second portion is facing the first portion across the balls. The balls thus travel along the race between the bushing and the shaft. This type of portion of an elliptical race leads to the presence of a first point of contact between the ball and the bushing. In the same way, a second point of contact exists between the same ball and the shaft. It should be noted that the bushing may remain stationary, with the shaft moving in translation relative to the bushing.

However, this type of bushing suffers from the drawback of having little rigidity and little resistance to application of high torque. It is then proposed to use races that are bullet-shaped with four points of contact. In such races, there are two points of contact between the ball and the bushing and two points of contact between the ball and the shaft. As described above, the race is made up of two portions facing each other, one being recessed in the bushing, and the other being recessed in the shaft.

The force-accompanying device 3 also includes a second member 7 that is circularly symmetrical about the axis X-X. The member 7 includes a cam 71 provided with a toothed wheel and with a cam path 72 that is secured to or integral with the wheel and that is disposed along the periphery thereof. As shown in FIGS. 1 and 2, the path 72 is symmetrical about a plane A defined by the axis X-X and by the axis Y-Y. In the same way, the path 72 is symmetrical about a plane B containing the axis X-X and perpendicular to the plane A.

Thus, four portions of cam path are defined, each of which corresponds substantially to one quarter of the full path. Each path quarter has two portions 72₁ and 72₂ having slopes of different inclinations. It should be noted that the inclination of the path portion 72₁ is less than the inclination portion of path 72₂ and that the profile of each of these slopes may be linear, parabolic, or exponential. It is also possible to make provision to combine these different types of slopes.

The cam path 72 also has two troughs 74₁ and 74₂ designed to receive respective ones of the two cam rollers 62₁ and 62₂. In addition, the path has two crests 76₁ and 76₂ designed to receive respective ones of the cam rollers 62₁ and 62₂. It can thus be noted that two successive path portions 72₁ are separated by one of the two crests 76₁ or 76₂ and that two successive path portions 72₂ are separated by one of the two troughs 74₁ or 74₂.

In addition, the assembly 1 includes a force transmission device 8 including a shaft 81 and an annular support 82 secured to a first end of the shaft. The shaft 81 is provided with grooves 83 making it possible for the ball bushing 64 to slide. These grooves are disposed in a central portion of the shaft 81. It can be noted that the grooves correspond to the race portion that is recessed in the shaft and that is semi-elliptical or bullet-shaped.

At the first end, the shaft 81 is provided with a through hole 86 passing diametrically through the end of the shaft. At its second end facing towards the member 7, the shaft 81 is provided with splines 84 designed to be received in the central opening 21 of the toothed wheel 2 and to co-operate with the grooves therein.

The force-accompanying device 3 also includes a resilient member 9 such as a helical spring, arranged between the support 61 and the support 82. By way of example, the spring 9 may merely be interposed between the two supports. The ends 91 and 92 of the spring are then truncated substantially transversely so that they match the shape of the two supports. It is also possible to make provision for each of the two ends 91 and 92 to be adhesively bonded to the respective one of the supports 82 and 61.

The assembly 1 further includes a cylindrical-roller bearing 12 disposed between the toothed wheel 2 and the cam 71. The roller bearing 12 is secured to a support 13 adapted to be inserted into the set-back portion 22 defined by the shoulder. The ring forming the roller bearing 12 has a width corresponding substantially to the width of the central opening of the cam 71. The roller bearing is designed to receive the portion of the shaft 81 that is disposed directly in the vicinity of the splines 84. The presence of the roller bearing 12 makes it possible to overcome the problem of friction while the members 7 and 8 are moving in rotation relative to each other.

The support device 5 includes a cylinder 51 provided with a diametrical opening 52. This opening is situated in that face of the diametrical opening 86 that is disposed at the end of the shaft 81, once the assembly 1 is assembled. A fuse 54 acting as a key may be received by the two openings 52 and 86 in order to constrain the shaft 81 to turn with the device 5.

In addition, the assembly 1 also includes a ball bearing 16 at the inlet, disposed around the cylinder 51 of the support device 5 of the splined shaft 4. It also includes a ball bearing 18 at the outlet adjacent to the toothed wheel 2. The presence of these two ball bearings makes it possible to obtain a degree of freedom for the assembly 1 relative to a casing (not shown) for supporting the assembly.

In operation, after the lever (not shown) has been actuated, a movement in rotation can be initiated by the member 7 in the context of a first operating mode of the assembly 1. The movement of the cam 71 may be triggered by an indexed motor (not shown in the figures). In addition, by indexing the motor in a "zero" position when the lever is in a central position, it is possible thus to define the "zero" reference position of the lever.

Firstly, the cam 71 is in an equilibrium position. The two rollers 62₁ and 62₂ are disposed in respective ones of the troughs 74₁ and 74₂. This equilibrium position thus defines a reference for zero torque. For an angle variation effected by the lever that is equal to zero, the outlet torque applied in return on the lever at the outlet is zero. In addition, since the spring is under little stress in this position, the movement of the rollers presents very little backlash, if any. In practice, the transmission assembly is preferably designed with a certain amount of axial pre-loading. That pre-loading naturally eliminates any angular backlash around the position of stability, unlike, inter alia, devices having pre-loaded torsion springs that are used conventionally and that are described, for example, in Document U.S. Pat. No. 6,641,085.

As shown in FIG. 6, the cam 71 then moves in rotation in the direction indicated by arrow $F_1$. The cam 71 turns about the shaft 81 which remains stationary. The cam is thus a "driving" cam, while the wheel 2 is a stationary wheel.

This movement in rotation of the cam 71 causes the pusher 6 to move in translation and, in particular, causes the two supports 61 and 63, the ball bushing 64, and the cam rollers 62₁ and 62₂ to move in translation, in the direction indicated by the arrows $F_2$, namely in a direction defined along the axis X-X. The cam rollers 62₁ and 62₂, initially in the troughs 74₁ and 74₂, then find themselves on the cam path 72 against which they bear over the entire width thereof. The two rollers have thus merely moved in translation in the direction indicated by arrows $F_2$. The movement in translation of the pusher 6 takes place along the shaft 81 via the ball bushing 64 that is guided in the grooves 83 in the shaft. The presence of the ball bushing makes it possible to obtain better transmission of the forces with very limited friction. To this end, the assembly 1 can be likened to a mechanical device generating an angular force relationship with low friction hysteresis, since all of the moving parts are mounted on rolling elements. The use of ball bushings provided with races that are bullet-shaped with four points of contact makes it possible to avoid any risk of jamming and thus any premature wear. In particular, such ball bushings having bullet-shaped races make it possible to transmit significant torque between the shaft and the bushing, while also making axial movements possible.

The pusher 6 is thus driven in the same movement in translation, namely in the direction indicated by arrows $F_2$. The end 92 of the spring that is secured to the support 61 also moves in the direction indicated by arrows $F_2$. Since the second end 91 of spring 9 is secured to the support 82 that is stationary, the spring thus finds itself compressed.

It can be noted that the length $L_0$ of the spring 9 in its initial position, shown in FIG. 1, is greater than its length $L_1$ shown in FIG. 6.

If the cam 71 continues to move in rotation in the direction indicated by arrow $F_1$, the cam path 72 continues to move in rotation in such a manner that the cam rollers $62_1$ and $62_2$ find themselves on respective ones of the two crests $76_1$ and $76_2$ of the path. The distance traveled by each of the cam rollers in the direction indicated by arrows $F_2$ is then at its maximum. The spring 9 continues to be compressed: it then has a length $L_2$ less than $L_o$ and less than $L_1$.

It should be noted that the inclination of the two portions of cam path $72_1$ and $72_2$ has a direct effect on the speed of execution of the movement in rotation. It is possible to determine that inclination so as to obtain return torque that is gradual. By way of example, when the pilot releases the lever, the spring 9 tends to return to its initial equilibrium position, shown in FIG. 1. The spring thus relaxes and the cam rollers $62_1$ and $62_2$ then tend to return to their equilibrium position, namely to position themselves in their respective troughs $74_1$ and $74_2$. If it is desired to have return torque that is fast in a first stage and then more gradual in a second stage, a cam path slope is chosen that is firstly steep and then less steep so that the speed of the cam rollers moving along the cam path 72 is adapted correspondingly. The use of the assembly 1 thus makes it possible for the pilot to feel a force as a function of the positioning angle of the lever.

It should be noted that the assembly 1 also makes it possible to define a reference position that is offset relative to the "zero" position. It is possible to define an initial position that is different for the cam troughs $74_1$ and $74_2$, e.g. by initially offsetting the cam 71 relative to the casing (not shown). In addition, this feature may also be achieved automatically. In which case, the autopilot function automatically shifts the anchor point defined by the initial position of the roller-receiving troughs $74_1$ and $74_2$.

The Applicant has observed that a state-of-the-art assembly using a torsion spring allows a maximum angular amplitude of 80° to be achieved, namely from −40° to +40°. The present invention can allow an angular amplitude of close to 160° C. to be achieved, namely from −80° to +80°. The spring working in compression in no way limits this amplitude, and management of the return torque is improved.

A second operating mode of the assembly 1 may be provided. The shaft 81 may, in turn, be a moving shaft and thus move in rotation in the direction indicated by arrow $F_1$, while the cam 71 remains stationary. In this operating mode, the shaft 81 is a "driving" shaft. It should be noted that the wheel 2 is also a "moving" wheel. The shaft 81 moving in rotation drives the pusher 6 in rotation. The rollers $62_1$ and $62_2$ that are secured to said pusher start turning and thus rise along the path 72. The rollers move in rotation in the direction indicated by arrow $F_1$ while also moving in translation in the direction indicated by arrows $F_2$. The compression of the spring 9 in this operating mode is comparable to the compression of the spring described in the context of the first operating mode.

In addition, it can be noted that the transmission assembly 1 and the associated assemblies (not shown) such as the control assembly, are subject to a low but non-zero probability of seizure. When such an event occurs, the pilot is led to exert a large force on the control stick in order to break the fuse 54. The pilot can then continue to pilot the aircraft. Conversely, the pilot then no longer enjoys, in particular, the same piloting precision and the same piloting comfort. In other words the return torque exerted in return on the stick is no longer exerted, and the pilot loses feel.

The invention claimed is:

1. A force transmission assembly, for transmitting forces between an input and an output, the force transmission assembly comprising:
    a force transmission device including a stationary shaft defining a central axis; and
    a force-accompanying device including:
        a cam being movable in rotation about the shaft;
        a pusher mounted about the shaft to be movable in translation along the shaft with the cam and which pusher includes a body having cam rollers mounted thereto so as to be engaged with and movable relative to a cam path of the cam, and a ball bushing secured within the body and about the shaft, the ball bushing being engaged with the shaft so as to be fixed from rotation about the shaft and to be movable in translation with the body along the shaft; and
        a resilient member mounted about the shaft so as to be compressible by the pusher to thereby exert force to engage the cam rollers against the cam path.

2. The transmission assembly according to claim 1, wherein the shaft includes grooves, the ball bushing being movable in translation relative to the shaft along the grooves.

3. The transmission assembly according to claim 1, wherein the ball bushing is provided with races in which balls are mounted, which races are bullet-shaped.

4. The transmission assembly according to claim 3, wherein the shaft includes grooves and wherein each of the grooves has a bullet-shaped profile and are disposed facing the races, such that the balls of the ball bushing move in translation within the grooves.

5. The transmission assembly according to claim 1, wherein the body of the pusher includes a first support for supporting a first end of the resilient member, the first support being secured to a second support provided with an opening adapted to receive a key in order to secure the body relative to the ball bushing.

6. The transmission assembly according to claim 5, wherein the shaft is provided with a substantially annular abutment support for supporting a second end of the resilient member.

7. The transmission assembly according to claim 1, wherein the cam path has a profile that is at least in part linear.

8. The transmission assembly according to claim 1, wherein the cam path has a profile that is at least in part curved.

9. The transmission assembly according to claim 1, wherein the cam path has a profile that includes portions having different slopes.

10. A control assembly comprising a lever, a direction control member, and a force transmission assembly for transmitting a force imparted by the lever to the direction control member, the force transmission assembly being a force transmission assembly according to claim 1.

11. A force transmission assembly, for transmitting forces between an input and an output, the force transmission assembly comprising:
   a force transmission device including a shaft defining a central axis about which the shaft rotates; and
   a force-accompanying device including:
      a stationary cam, the shaft being movable in rotation within the cam;
      a pusher mounted about the shaft so as to be driven in rotation by the shaft and to be movable in translation along the shaft and which pusher includes a body having cam rollers mounted thereto so as to be engaged with and movable relative to a cam path of the cam, and a ball bushing secured within the body and about the shaft, the ball bushing being engaged with the shaft so as to be fixed from rotation about the shaft and to be movable in translation with the body along the shaft; and
      a resilient member mounted about the shaft so as to be compressible by the pusher to thereby exert force to engage the cam rollers against the cam path.

12. The transmission assembly according to claim 11, wherein the shaft includes grooves, the ball bushing being movable in translation relative to the shaft along the grooves.

13. The transmission assembly according to claim 11, wherein the ball bushing is provided with races in which balls are mounted, which races are bullet-shaped.

14. The transmission assembly according to claim 13, wherein the shaft includes grooves and wherein each of the grooves has a bullet-shaped profile and are disposed facing the races, such that the balls of the ball bushing move in translation within the grooves.

15. The transmission assembly according to claim 11, wherein the body of the pusher includes a first support for supporting a first end of the resilient member, the first support being secured to a second support provided with an opening adapted to receive a key in order to secure the body relative to the ball bushing.

16. The transmission assembly according to claim 15, wherein the shaft is provided with a substantially annular abutment support for supporting a second end of the resilient member.

17. The transmission assembly according to claim 11, wherein the cam path has a profile at least in part linear.

18. The transmission assembly according to claim 11, wherein the cam path has a profile that is at least in part curved.

19. The transmission assembly according to claim 11, wherein the cam path has a profile that includes portions having different slopes.

20. A control assembly comprising a lever, a direction control member, and a force transmission assembly for transmitting a force imparted by the lever to the direction control member, the force transmission assembly being a force transmission assembly according to claim 11.

* * * * *